Figures 1, 2:
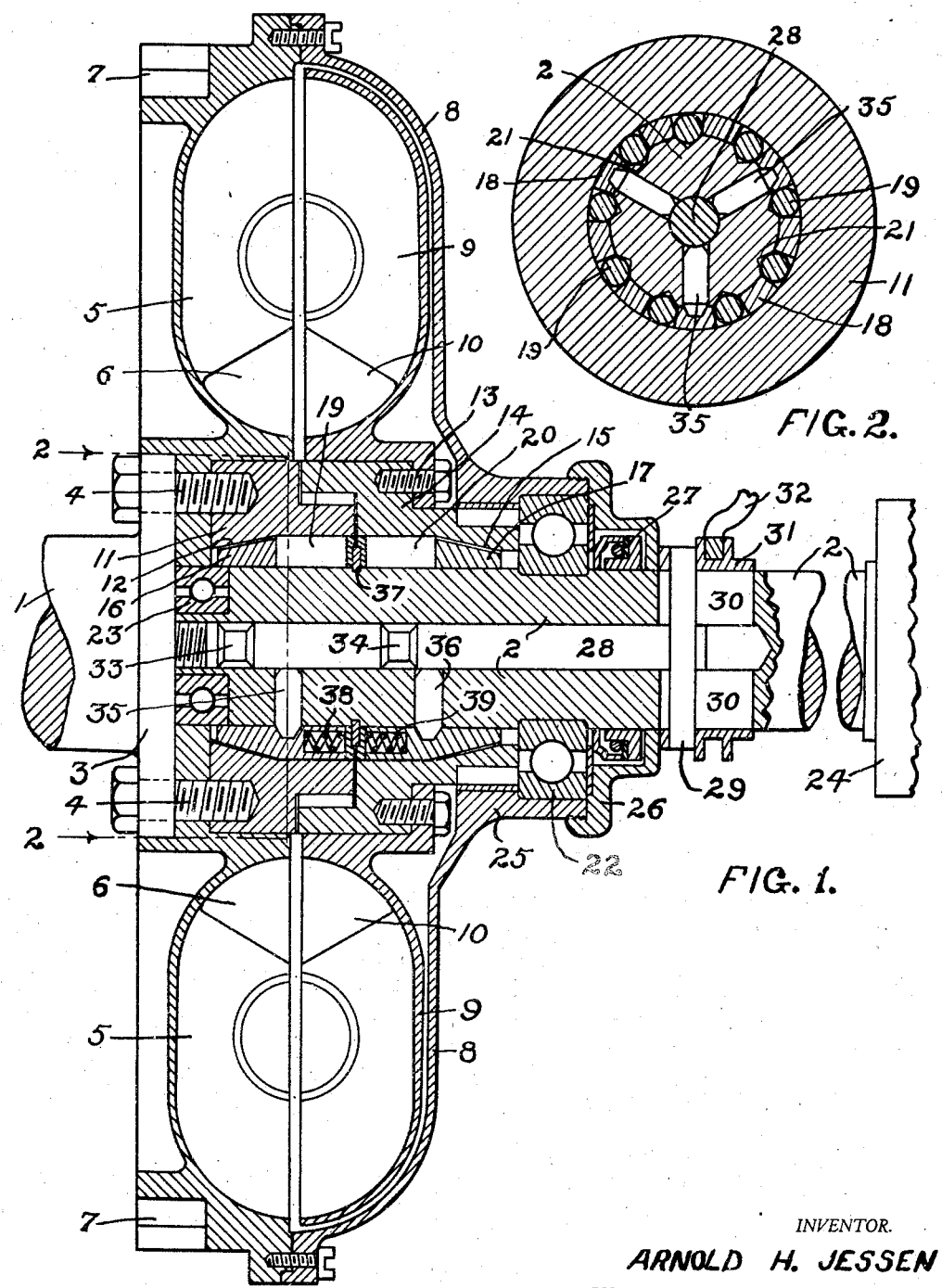

July 7, 1942. A. H. JESSEN 2,289,019
HYDRAULIC COUPLING WITH NEUTRAL AND DUAL LOCKING MEANS THEREFOR
Filed July 25, 1939

INVENTOR.
ARNOLD H. JESSEN
BY
ATTORNEY.

Patented July 7, 1942

2,289,019

UNITED STATES PATENT OFFICE 2,289,019

HYDRAULIC COUPLING WITH NEUTRAL AND DUAL LOCKING MEANS THEREFOR

Arnold H. Jessen, Los Angeles, Calif.

Application July 25, 1939, Serial No. 286,416

16 Claims. (Cl. 192—3.2)

This invention relates to hydraulic or fluid couplings interposed between two relatively rotatable members for transmitting power from one to the other. The invention is capable of use in various relations, but as it is my belief that it will find its most common use in automotive vehicles, I have chosen to show it as a coupling between the crank-shaft and the driven shaft of such a vehicle.

Automotive engineers recognize that there are certain important advantages derivable from the use of a hydraulic coupling in the train of gearing between the engine and the rear wheels of an automotive vehicle. It gives to the vehicle so equipped much of the flexibility and smooth running of a steam or electric vehicle. Such couplings are, broadly speaking, not new, and I make no claim to any features of the same except the means for attaching the driven shaft to the hydraulic mechanism so as to provide for a neutral, a high-speed or direct drive and a low-speed drive through said mechanism, such means comprising a locking mechanism for holding the attaching means in any of its set positions.

In all the hydraulic drives known to me, it is necessary to provide a clutch, as in the ordinary drive, for disconnecting the driven shaft from the fluid coupling when shifting gears. This, heretofore, has been the ordinary standard clutch mechanism incorporated between the fluid coupling and the transmission and therefore is no direct part of the fluid drive. One of the objects of my invention is the elimination of this clutch, thus simplifying and cheapening the construction by inserting the means hereinafter specified as a direct part of the fluid coupling. Further, in all known hydraulic drives, the power is always transmitted through the fluid of the hydraulic mechanism. No means is provided for attaching the driven shaft to the drive shaft for a direct drive from the latter shaft, as in the ordinary gear drive. Another object of my invention is to provide for such direct drive.

In the drawing which shows what is now my preferred structure

Fig. 1 is a longitudinal sectional view taken centrally through the coupling, parts appearing in elevation; and Fig. 2 is a transverse section, as on line 2—2 of Fig. 1.

Taking up a more detailed description by reference to said drawing, 1 is a rotatable driving member and 2 is a rotatable driven member, which may be used in various relations but, in the present instance, are the drive and driven shafts of an automotive vehicle. The mechanism for turning the drive shaft 1 is not shown nor are the gears with which the driven shaft cooperates disclosed since they are well known and form no part of my present invention. At its inner end the shaft 1 is provided with a disk 3 to which there is secured, as by bolts 4, the impeller and flywheel combination 5 of the hydraulic coupling. This impeller is provided with the usual series of blades or vanes, only one of which is shown at 6, and with the large annular gear 7 for engagement by the pinion, not shown, of the starter. This impeller member 5 is dish-shaped and forms one side wall of a hollow, liquid-tight casing, the other side of which is shown at 8. Within the casing and spaced slightly from the inner edges of the vanes 6 is the runner 9 of the hydraulic drive, the runner being provided with a series of blades or vanes 10 which correspond and are opposed to the vanes 6 of the impeller member 5. The casing is filled with oil, usually to about 80% of its capacity.

All of the structure which has thus far been described is common in the art and no claim is made for it except as part of the general combination. In view of this fact, it is believed that the drawing and the description thereof are ample.

The bolts 4 extend inwardly into a torque ring 11 which surrounds the driven shaft 2 and is spaced therefrom. The interior annular surface of this ring is smooth and the outer part of said surface is tapered at 12, for a purpose hereinafter explained. Being thus bolted to the flange 3 of the drive shaft, this ring always turns with said shaft. Likewise bolted to the runner 9 at 13 is a torque ring 14 which also surrounds the driven shaft and is spaced therefrom, its interior surface being tapered at 15. Within the rings 11 and 14 is a pair of cages 16 and 17, each of said cages contacting with and surrounding the driven shaft 2 and being provided with tapered outer ends corresponding to the tapered surfaces 12 and 15 of the rings 11 and 14. Normally the tapered surfaces of the rings and cages are slightly spaced apart, as indicated in Fig. 1. The cages are adapted for slight rotative movement upon the driven shaft. Each of the cages is provided with a series of spaced fingers 18, as shown in Fig. 2; and in the spaces between the fingers are roller elements 19 and 20 which are adapted to roll against the interior annular surfaces of the rings 11 and 14 respectively. The outer surface of the driven shaft 2 is provided with a series of grooves 21, there being a groove for each of the elements 19 and 20. When these elements are centralized opposite their respective grooves, the elements do not touch the driven shaft, but may turn freely in their grooves. While these grooves may be otherwise shaped, if desired, I prefer to make them V-shaped, as shown. When either of the rings 11 or 14 is turned relatively to its respective cage 16 or 17, the corresponding elements 19 or 20 are caused to roll upon an inclined side of their respective grooves 21, with the result that the elements are jammed between the ring and the said inclined side of the grooves and the driven shaft 2 is forced to rotate with the ring which has been relatively rotated.

The driven shaft is mounted in roller bearings 22 and 23, and said shaft extends from the hydraulic coupling into the ordinary transmission gear-casing, which is indicated at 24. Within this gear-casing are the transmission gears of various sizes to transmit the power from the shaft 2 to the shaft extending to the differential gears of the vehicle. Since these transmission gears and the shaft leading to the differential are all well-known, the same are not shown and require no further description. Specifically, they form no part of my invention. The roller bearing 22 is within a hub-like extension 25 of the casing-member 8, said extension being threaded to be engaged by a cap 26. Surrounding the driven shaft within this cap is a packing gland 27 which need not be specifically described, since it forms no part of this invention. It is intended to prevent the oil from leaking from the casing of the hydraulic coupling.

The driven shaft 2 is centrally bored to receive a slidable rod or shaft 28. At its rear end, this shaft is provided with a cross pin 29 which extends outwardly through slots 30 in the driven shaft, and this cross pin is engaged by a collar 31 which is slidable upon the driven shaft. Any suitable means, as indicated at 32, may be employed for shifting this collar to slide the shaft or rod 28 back and forth longitudinally in the driven shaft. This rod or shaft 28 is provided with a pair of peripheral grooves 33 and 34. The driven shaft is further provided with radial bores to receive a series of radially extending pins 35 and 36, the inner ends of which are adapted to contact with the sliding rod or shaft 28 and to enter the grooves 33 or 34 when the rod is shifted to bring them into register with the respective pins. There are two sets of the pins, the set 35 being adapted to enter the peripheral groove 33 and the set 36 being adapted to enter the groove 34. The inner ends of the pins are rounded so as to be more readily moved outwardly by the camming action of the said grooves which are provided with inclined sides. The outer ends of the pins are tapered to enter and fit into sockets in the cages 16 and 17. It is preferred that each of the cages be provided with three of these sockets and that three pins be provided for each cage and the sockets therein, such a structure being shown in Fig. 2, the pins and sockets being spaced equidistantly. Between the adjacent ends of the cages 16 and 17 is a snap-ring 37 which is sprung into a peripheral groove in the driven shaft and is projected outwardly therefrom to form an abutment for a set of coiled springs 38 and 39 which are positioned in sockets in the ends of the fingers 18 of the cages 16 and 17. These springs are under slight compression so that they will expand and move the cages laterally to bring the inclined surfaces thereof into frictional contact with the surfaces 12 and 15 of the rings 11 and 14 whenever the pins are released from their sockets in the cages.

In Fig. 1, the pins are shown in their respective sockets in the cages, having been forced into that position by the shifting of the rod or shaft 28 so as to move the peripheral grooves 33 and 34 out of register with said pins. When these pins are in the position shown in Fig. 1 the roller elements 19 and 20 are all in their central positions, as shown in Fig. 2, and no power is transmitted through them to the driven shaft. If, now, the rod or shaft be shifted rearwardly or to the right into what may be termed its first driving position, the groove 34 is brought into register with the pins 36, whereupon the latter pins release the cage 17, the spring 39 shifts the cage to the right, to bring its conical surface into frictional engagement with the corresponding conical surface of the ring 14. This engagement will cause the cage to rotate with the ring and thus cause the roller elements 20 to engage a side of the V-shaped grooves in the driven shaft so that said shaft is rotated with the ring 14. Further movement to the right of the rod or shaft 28 cams the pins 36 outwardly into the sockets in the cage 17 and thus locks the cage again in its neutral position, as shown in Fig. 1. In the meanwhile the groove 33 in said rod has not reached the pins 35 and the cage 16 has been held in neutral position. Consequently, the torque has all been transmitted through the hydraulic coupling and through the roller elements 20. But the last movement of the rod or shaft 28 has brought the groove 33 almost to its pins 35. Thereafter, a slight further movement of the rod brings the groove 33 into register with said pins, whereupon the latter release their cage 16, the spring 38 forces the cage to the left and it is rotated with its ring which causes the roller elements 19 to clutch the ring 11 direct to the driven shaft. While this is taking place, the cage 17 is locked in its neutral position. There is thus established a direct drive between the drive shaft 1 and the driven shaft 2, and although the hydraulic coupling members 5 and 9 may continue to agitate the oil in the casing, no power will be transmitted through said oil.

Summing up the operations and the advantages derived therefrom, it will first be pointed out that when the parts are in the position shown in the drawing, no torque is being transmitted to the driven shaft although the drive shaft may be rotating. That is because the cages are locked in their neutral positions and the roller elements have no driving contact with the driven shaft. Assuming that the vehicle is moving and it be desired to shift the transmission gears, it is necessary only to shift the rod or shaft 28 to the neutral position shown. That frees the driven shaft and the shift of gears may be made without the use of the ordinary clutch mechanism. My invention eliminates such a clutch and therefore simplifies and cheapens the construction, being a direct part of the fluid coupling. Although the drive shaft may continue to rotate and the runner of the hydraulic coupling to spin, no power is being transmitted to the driven shaft. The conical surfaces of the torque rings and the cages are out of contact and there is a minimum of friction between the rings and cages. Having shifted the transmission, either set of roller elements may be brought into action by simply sliding the rod 28; and if the set 19 be the one chosen, the drive is direct from the shaft 1 to the shaft 2.

At that time the runner 9 is rotating but is freed from the shaft 2.

One advantage of my invention may be emphasized. That is the dual nature of the means for clutching the runner 9 and its torque ring 14 to the driven shaft. As soon as the pins 36 are released from the sockets in their cage 17, said cage is shifted to bring its tapered end into frictional engagement with the tapered surface 15 of the ring 14. These two parts are thus clutched together and the cage is turned slightly with the ring and upon the driven shaft 2. Very little torque is transmitted to the shaft, but that transmitted to the cage is sufficient to force the elements 20 up one of the inclined sides of the respective grooves 21 in the shaft and thus establish a driving relation between the ring 14 and the shaft. This driving or clutching relation would not be possible without the first mentioned clutching action between the cage 17 and the ring 14, for the elements 20 will not roll up the inclined side of the groove in the shaft unless they are impelled so to do by the torque transmitted to the cage. They will simply turn in their grooves unless the said inclined sides are but slightly inclined, in which case they will probably roll up the incline but will not roll back again and the shaft will not be unclutched. This dual clutching means is, therefore, necessary, one clutch serving to force the elements up the inclined sides of their grooves and the other to establish the necessary driving relation between the torque ring and shaft. While this description is confined to the dual clutching means between the torque ring 14 and the driven shaft 2, it is obvious that the ring 11 has the same dual clutching means between it and said shaft.

By making the grooves 21 V-shaped, the rollers 19 and 20 may contact with either of the inclined sides of the grooves and thus provide for transmission of power either from the engine to the rear vehicle wheels or from said wheels to the engine, in which latter case the engine serves as a brake for the vehicle. Further, the rollers may be stopped and held in their mid position which leaves the wheels free to turn.

Having described my invention, I claim:

1. In a device of the character described, the combination with a rotary driving member, of a rotary driven member in axial alinement therewith, a hydraulic coupling connecting said members, said coupling comprising a bladed impeller, an opposed bladed runner, and a casing member cooperating with the said impeller to form a closed casing for a liquid, a torque ring rigidly connected with the impeller, a second torque ring rigidly connected with the runner, said rings surrounding the driven member and being coaxial therewith but spaced therefrom, a cage for clutching elements within each of the said rings in the spaces between the rings and the driven member, the latter member being provided with longitudinally extending grooves in its peripheral surface in opposed relation to both of said rings, a series of clutching elements carried by each of said cages, there being one of said elements for and within each of the said grooves in the driven member, and controlled means for causing the clutching elements of one cage to enter into clutching engagement with a wall of their respective grooves to cause the driven member to turn with that torque ring which cooperates with the clutched elements and, at the same time to hold the opposite cage in neutral position so that its clutching elements cannot clutch the driven member.

2. A device as set forth in claim 1 in which the driving and the driven members are respectively the drive and driven shafts of an automotive vehicle and in which the grooves in the driven shaft are V-shaped so that the clutching elements may engage with either wall of the respective grooves and thus provide for the transmission of power either from the drive to the driven shaft or, reversely, from the normally driven to the drive shaft.

3. A device as set forth in claim 1 in which the clutching elements are rollers and in which the grooves in the driven member are V-shaped, so that the rollers may enter into clutching engagement with either side of their respective grooves to provide for power transmission from the active torque ring to the driven member or, reversely, from the normally driven member to the said torque ring depending upon which side of the V-shaped grooves are engaged by the rollers.

4. A device of the character described comprising a drive shaft, a driven shaft coaxial therewith, a hydraulic coupler connecting said shafts, said coupler comprising a bladed impeller and a bladed runner with a liquid power transmitting medium therebetween, a torque member attached to the drive shaft and surrounding the driven shaft but spaced therefrom, a second torque member attached to the runner of the hydraulic coupler also surrounding but spaced from the driven shaft, the inner annular surfaces of said rings and the peripheral surface of the driven shaft forming opposed clutch surfaces, one of said surfaces being provided with an annular row of V-shaped grooves, a pair of cages fitted about the driven shaft in the spaces between the rings and the driven shaft, each of said cages having a series of parallel fingers extending along the said shaft and forming pockets corresponding in number to the said grooves, a series of roller elements in said pockets and extending into the said V-shaped grooves, means for locking the cages in a position for holding the roller elements centrally in the said grooves and out of driving contact with either side of their respective grooves so that no torque is transmitted through said elements, said means being further adapted for unlocking the cages one at a time and thus permitting the roller elements of the unlocked cage to move into driving engagement with one side or the other of the respective V-shaped grooves, thus clutching the driven shaft to that torque member corresponding to the cage which has been unlocked, whereby when the cage which corresponds to the torque member of the drive shaft is unlocked the said drive shaft is connected to the driven shaft for direct drive and when the other cage is unlocked the driven shaft is connected indirectly to the drive shaft through the hydraulic coupler.

5. A device as set forth in claim 4 in which the V-shaped grooves are in the driven member.

6. A device as set forth in claim 4 in which the means for locking and unlocking the cages comprises a slidable rod in a bore in the axis of the driven shaft, said rod having a pair of spaced depressions therein, a pair of sets of pins mounted in the driven shaft and adapted for movement endwise toward and from the said rod, said pins being held outwardly to engage with and lock the cages from movement on the driven shaft when the pins are out of register with the depressions in the rod and being permitted to enter said depressions to release the cages when the rod is moved until the depressions therein register with the pins, and means for sliding said rod.

7. A device of the character described comprising a drive shaft, a driven shaft coaxial therewith, a torque member surrounding the driven shaft and rigidly connected with the drive shaft, said member being coaxial with the driven shaft but spaced therefrom, a second torque member in end-to-end relation with the first mentioned torque member, said second torque member also being coaxial with the driven shaft but spaced therefrom, the inner annular surfaces of said torque member having a portion of their areas of uniform and equal diameters and the remaining portions tapered, said uniform portions of the members being equidistantly spaced from the driven shaft to form clutching surfaces and the outer peripheral surface of the driven shaft forming the cooperating and opposed clutch surface and one of the opposed surfaces being provided with V-shaped grooves, means connecting the said torque members and adapted to turn the second of said members at speeds different from the speeds of the first of said members, a pair of cages fitted about the driven shaft within the inner annular surfaces of said torque members having a portion of their outer surfaces fitted to the respective uniform and equal diametral areas of said annular surfaces of the torque members and the remaining portions of their outer surface tapered to fit against the tapered portions of the surrounding torque members, an abutment on the driven shaft extending outwardly therefrom between the adjacent ends of the cages, tensioned springs between each side of the said abutment and the cages adapted to force the tapered portions of the cages into clutching engagement with the tapered portions of the torque members, a plurality of clutch elements mounted in said cages within the V-shaped grooves in the clutch surface, means for locking said cages against movement by their respective springs and in such position as to hold the clutch elements out of engagement with its respective torque member and to permit the clutching elements of the released cage to engage with a side of the V-shaped grooves to establish a driving relation between the driven shaft and the last mentioned torque member.

8. A device as set forth in claim 7 in which the cages are each provided with a socket and in which the means for locking the cages are pins mounted radially in the driven shaft and adapted for endwise and outward movement into locking engagement in the sockets of the cages.

9. A device as set forth in claim 7 in which the cages are each provided with conical-shaped sockets and in which the means for locking the cages are pins which are mounted in radial bores in the driven shaft and are adapted for radial movement in said bores, the outer ends of said pins being cone-shaped to enter the conical sockets in said cages.

10. A device as set forth in claim 7 in which the cages are each provided with sockets, said cages being held in locked positions by pins which are mounted in radial bores in the driven shaft and adapted for endwise outward movement in said bores until their outer ends enter their respective sockets in the cages and in which the means for causing the locking means to unlock the cages comprises a slidable rod in a bore formed in the axial center of the driven shaft, against which rod the inner ends of said pins abut, said rod being provided with a plurality of spaced depressions into which the inner ends of the pins may enter when the rod is moved longitudinally thus to release the pins from said sockets, and means for sliding said rod longitudinally.

11. In a device of the character described, the combination with a rotary driving member, of a rotary driven member in axial alinement therewith, means for clutching said driving member directly to the driven member for rotating the latter at the same speed as the driving member, a torque ring surrounding the driven member and being coaxial therewith but spaced therefrom, a cage for clutching elements within the said torque ring in the space between it and the driven member, the latter member being provided with longitudinally extending grooves in its peripheral surface in opposed relation to the said ring, a series of clutching elements for and within each of the said grooves, and controlled means for causing said clutching elements to enter into clutching engagement with a wall of their respective grooves to cause the driven member to turn with the torque ring and, at the same time to disengage the clutch for the direct drive between the driving and the driven members, and a coupling connecting said torque ring with the driving member and adapted to rotate the ring at speeds different from the speeds of the driving member.

12. In a device of the character described, the combination with a rotary driving member, of a rotary driven member in axial alinement therewith, a torque ring rigidly connected with the driving member, a second torque ring in axial alinement with the first torque ring, said rings surrounding the driven member but spaced therefrom, a coupling connecting the said torque rings and adapted to rotate the second ring at speeds different from the speeds of the first ring, a cage for clutching elements within each of the said rings in the spaces between the rings and the driven member, the latter member being provided with longitudinally extending grooves in its peripheral surface in opposed relation to both of said rings, a series of clutching elements carried by each of said cages, there being one of said elements for and within each of the said grooves in the driven member, and controlled means for causing the clutching elements of one cage to enter into clutching engagement with a wall of their respective grooves to cause the driven member to turn with that torque ring which cooperates with the clutched elements and, at the same time, to hold the other cage in neutral position so that its clutching elements cannot clutch the driven member.

13. A coupling between two rotatable members, said coupling comprising a torque ring connected with one of said members and surrounding but spaced from the other of said members, said torque ring and the said other member being provided with opposing clutch engaging surfaces, one of said surfaces having a circular series of grooves extending thereabout, a cage for clutch elements surrounding the said other member in the space between it and the torque ring, said cage and ring being provided with normally disengaged frictional surfaces, a spring tending to hold said frictional surfaces together and to cause the cage to rock on the said other member, a series of rotatable clutch elements mounted in said cage and extending into the respective grooves in said other member, and controlling means for holding the clutch elements out of driving engagement with either of the sides of said grooves so that no power is transmitted between the torque and the other member and for holding said frictional surfaces disengaged, said controlling means being adapted to release the cage and allow the said spring to force the said frictional surfaces together and cause the cage to rock and thus force the rotatable clutch elements to roll up one or the other of the sides of the said grooves and thus establish driving relation between the torque ring and the said other member.

14. A coupling as set forth in claim 13 in which the two rotatable members are a drive and a driven shaft and in which the series of grooves extend about the driven shaft and are V-shaped.

15. A coupling as set forth in claim 13 in which the frictional surfaces on the torque ring and the cage are conical.

16. A coupling as set forth in claim 13 in which the two rotatable members are a drive and a driven shaft in axial alinement with each other and in which the torque ring is coaxial with said drive shaft.

ARNOLD H. JESSEN.